(12) United States Patent
Chiu et al.

(10) Patent No.: US 9,318,269 B2
(45) Date of Patent: Apr. 19, 2016

(54) PACKAGING STRUCTURES OF AN ENERGY STORAGE DEVICE

(71) Applicant: FENG CHIA UNIVERSITY, Taichung (TW)

(72) Inventors: Kuo-Feng Chiu, Taichung (TW); Shi-Kun Chen, Taichung (TW); Tse-Hao Ko, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 217 days.

(21) Appl. No.: 14/106,711

(22) Filed: Dec. 13, 2013

(65) Prior Publication Data
US 2015/0002990 A1    Jan. 1, 2015

(30) Foreign Application Priority Data
Jun. 28, 2013  (TW) .............................. 102123288 A

(51) Int. Cl.
| | |
|---|---|
| *H01G 11/00* | (2013.01) |
| *H01G 9/08* | (2006.01) |
| *H01G 2/10* | (2006.01) |
| *H01G 9/10* | (2006.01) |
| *H01G 9/15* | (2006.01) |

(52) U.S. Cl.
CPC .  *H01G 9/10* (2013.01); *H01G 9/08* (2013.01); *H01G 9/15* (2013.01)

(58) Field of Classification Search
USPC ........................... 361/502, 517, 522, 535, 541
See application file for complete search history.

(56) References Cited

U.S. PATENT DOCUMENTS

| | | | | |
|---|---|---|---|---|
| 2001/0053059 A1* | 12/2001 | Saito | ........................ | H01G 9/08 361/502 |
| 2006/0222935 A1* | 10/2006 | Takahashi | .............. | H01G 9/155 429/142 |
| 2012/0092808 A1* | 4/2012 | Kim | ........................ | H01G 11/12 361/502 |

FOREIGN PATENT DOCUMENTS

JP            05267101 A   * 10/2003

* cited by examiner

*Primary Examiner* — Eric Thomas
(74) *Attorney, Agent, or Firm* — Cheng-Ju Chiang

(57) ABSTRACT

The invention relates to a packaging structure of an energy storage device. At least one unit cell of capacitor is stacked and packaged into the energy storage device. The unit cell is a sandwich structure comprising a solid-state polymer electrolyte between two modified carbonaceous electrodes. An assembly of at least one unit cell of capacitor can be packaged by metallic cases to form a coin cell type or screw type of the packaging structure, packaged with a plastic case by compression molding or injection molding, or packaged by a plastic bag or an aluminum-foil bag and sealed by heat sealing or vacuum heat sealing. Manufacture processes for traditional capacitor modules, such as drilling, welding, screwing, and making scaffolds, are not required. Although the packaging process is simpler and less expensive, the packaged energy storage device can perform better than traditional capacitor modules.

8 Claims, 5 Drawing Sheets

PACKAGING STRUCTURES OF AN ENERGY STORAGE DEVICE

BACKGROUND OF THE INVENTION

1. Filed the Invention

The present invention relates to packaging structures of an energy storage device, more particularly to at least one unit cell of capacitor by being repeatedly stacked and packaged to form the energy storage device.

2. Description of Related Art

A traditional capacitor comprises a pair of metallic collectors, a pair of electrodes, electrolyte, and a separator. The outer layer of the electrode is the metallic collector. The separator which is porous and the electrolyte are interposed between the two electrodes. In that the electrolyte is in the form of liquid or gel, a separator is needed to be interposed between the electrodes to prevent self-discharge and short circuit. The leakage of the electrolyte also needs to be prevented by polymeric sealing rings outside the pair of collectors. The packaging process can be completed by following steps of two leads penetrating a plastic case which may be made of polyvinylchloride (PVC) from outside, the two leads being welded on the surfaces of the metallic collectors, epoxy being injected into the case and then cured. In that there are many concerns of the traditional capacitor, such as leakage of the electrolyte and current steering on the collector, the packaging process of the traditional capacitor is far more complicated; moreover, there are more problems of being toxic, easily combustible, leakage, not being safe for use, and higher manufacturing cost.

To boost output voltage and power, traditional capacitors are connected both in series and in parallel and are manufactured by drilling, welding, screwing with nails and different ways of wire connection to become a capacitor module with high performance. Consequently, the manufacturing process becomes more complicated and the cost for that is also raised and the volume of the capacitor module becomes bigger. A traditional capacitor possesses only single unit cell. This is due to the high electrical resistance of the electrodes of the unit cell, which make it not appropriate to fabricate a traditional capacitor by packaging stacked unit cells in series to boost the voltage and power.

SUMMARY OF THE INVENTION

The present invention adopts a capacitor containing at least one unit cell which is a sandwich structure and comprises a solid-state polymer electrolyte interposed between two electrodes to solve the described problems of being toxic, easily combustible, leakage, not being safe for use, and higher manufacturing cost, or disadvantages of being difficult to be packaged, complicated manufacturing process, being not appropriate for the unit cells of traditional capacitors to be stacked and connected in series. Because of the high electrical conductivity of electrode and electrolytes in the present invention, several unit cells can be stacked directly before packaging, and form a capacitor with high voltage and high power. The capacitor could perform even better than a traditional capacitor module. The structure eliminates the arrangement of collectors and separators which is required for a traditional capacitor. Because the present invention could omit the need of drilling, welding, screwing with nails and making scaffolds, and different ways of wire connection while a traditional capacitor module is installed, the cost for manufacturing can be reduced.

The present invention provides a packaging structure of an energy storage device which comprises an upper package, a lower package, an assembly of at least one unit cell of capacitor. The lower package is combined with the upper package. The assembly of at least one unit cell of capacitor is configured between the upper package and the lower package, and comprises at least one unit cell of capacitor being repeatedly stacked. The at least one unit cell of capacitor is a sandwich structure and comprises a solid-state polymer electrolyte between two modified carbonaceous electrodes. Because the thickness of single unit cell of capacitor is less than 5 millimeters (mm), the thickness after the at least one unit cell of capacitor being repeatedly stacked remains small. The assembly of the at least one unit cell of capacitor can be packaged with metallic cases to form a coin cell type or a screw type of the packaging structure. The assembly of the at least one unit cell of capacitor can be packaged with a plastic case by compression molding or injection molding. The assembly of the at least one unit cell of capacitor can also be packaged with a plastic bag or an aluminum-foil bag containing a layer of plastic material inside and sealed by a way of heat sealing or vacuum heat sealing to form an energy storage device with high voltage and power. The ways to package the assembly of the at least one unit cell of capacitor save the manufacturing cost of drilling, welding, screwing with nails and making scaffolds which are common processes for traditional capacitor modules.

The present invention comprises a pair of modified carbonaceous electrodes which can be an electrically conductive carbon fiber material coated with an active material. The conductive carbon fiber material can be a carbon cloth, carbon felt, or carbon paper. They perform better than traditional electrodes which are normally made by coating active materials on metallic collectors. The present invention can be provided without the collector and separator because of the highly conductive carbon fiber material and solid-state polymer electrolyte. Consequently, the manufacturing process can be simplified without the traditional liquid or gel electrolyte. The concern of leakage of electrolyte thus does not exist. The present invention thus has the advantages of anti-combustion and preventing environmental pollution.

When the assembly of the at least one unit cell of capacitor is packaged by metallic cases, the packaging structure comprises an upper metallic case, and a lower metallic case which can be combined with the upper metallic case. A sealing gasket is interposed between the upper metallic case and the lower metallic case. The packaging structure comprises an assembly of the at least one unit cell which is repeatedly stacked. The assembly of the at least one unit cell of capacitor is configured in the lower metallic case. The at least one unit cell of capacitor is a sandwich structure and comprises a solid-state polymer electrolyte between the two modified carbonaceous electrodes. The two modified carbonaceous electrodes which can be a conductive carbon fiber material coated with an active material. The conductive carbon fiber material can be a carbon cloth, carbon felt, or carbon paper. The present invention can be provided without the collector and separator because of the highly conductive carbon fiber material and solid-state polymer electrolyte. The coin cell type of the packaging structure is formed by a pair of metallic cases combined tightly with the sealing gasket by stamping. The screw type of the packaging structure is formed by the upper and the lower metallic cases with female and male threads able to be screwed with the sealing gasket. By the metallic-case packaging process in the present invention, the shapes of the energy storage device can be a coin cell shape or a cylindrical shape. Owing to high conductivity of the two modified carbonaceous electrodes which directly contact metallic cases, the upper and lower metallic cases exhibit both the functions of current collectors and conducting leads in the traditional capacitor.

When the assembly of the at least one unit cell of capacitor is sealed by a plastic package, the plastic package can be a plastic case, a plastic bag or an aluminum-foil bag with a layer of plastic material inside. The packaging structure comprises the assembly of the at least one unit cell of capacitor being repeatedly stacked. Two leads are connected to the outer surfaces of the assembly of the at least one unit cell of capacitor individually. The two leads are partially exposed outside the plastic package. The at least one unit cell of capacitor is a sandwich structure and comprises a solid-state polymer electrolyte between two modified carbonaceous electrodes. When the plastic package is a plastic case, the two leads are connected to the surfaces of the two modified carbonaceous electrodes individually, and by a way of welding or bonding with conductive adhesive. The assembly of the at least one unit cell of capacitor is finally packaged with a plastic case through a way of compression molding or injection molding. The two leads are partially exposed outside the plastic case. The present invention can be easily implemented by mass production process.

When the plastic package is a plastic bag or an aluminum-foil bag with a layer of plastic material inside, the two leads can be connected to the two modified carbonaceous electrodes by a way of welding or bonding with conductive adhesive. The bag type of the packaging structure is formed by placing the assembly of the at least one unit cell of capacitor into a plastic bag or an aluminum-foil bag with a layer of plastic material inside; afterward, the plastic bag or the aluminum-foil bag is sealed by heat sealing or vacuum heat sealing. The two leads are partially exposed outside the plastic bag or the aluminum-foil bag. After being packaged and sealed, the energy storage device can be rolled up or folded and placed into a solid protective case. A lid is put on the protective case. Another bag type of package is thus completed.

Shapes or sizes of above disclosure of the packaging structures can be changed in accordance with needs. By the material innovation and structural design of modified carbonaceous electrodes and solid-state polymer electrolytes, it is easier to package the capacitor by repeatedly stacking the at least one unit cell of capacitor. Comparing to traditional capacitor modules, manufacture process of drilling, welding, screwing with nails or making scaffolds becomes unnecessary. Consequently, the cost for manufacturing can be reduced. In the present invention, in that thickness of single unit cell of capacitor is less than 5 mm, thickness of the assembly of the at least one unit cell of capacitor after being stacked remains small. Working voltage of single unit cell can reach several voltages, and power of it can be over thousands of watts and therefore the capacitor containing several unit cells which are repeatedly stacked and afterward packaged can acquire higher voltage and power. The present invention can perform better than a traditional capacitor module which is formed by connecting capacitors in series and in parallel. Massive storage device of the present invention can be utilized in electric grids, wind turbine systems, electric vehicles, or uninterruptible power supplies; small storage devices of the present invention can be utilized in various kinds of electronic devices.

BRIEF DESCRIPTION OF THE DRAWINGS

FIG. 6 (b) illustrates the assembly of two stacked unit cells of capacitor.

FIG. 6 (c) illustrates a bag type of the packaging structure in the present invention.

FIG. 7 (b) illustrates another preferable embodiment of a bag type of the packaging structure in the present invention.

FIG. 7 (c) illustrates the protective case of the energy storage device in the present invention.

FIG. 7 (d) illustrates the energy storage device with the protective case and lid in the present invention.

DETAILED DESCRIPTION OF THE INVENTION

By material innovation and structural design of two modified carbonaceous electrodes and solid-state polymer electrolyte, it is easier to package the capacitor containing repeatedly stacked unit cells. The ways of packaging can be simplified, without drilling, welding, screwing with nails and making scaffolds which are common ways in the manufacture of a traditional capacitor module. The cost of manufacture can also be reduced. The thorough disclosure of the packaging structure is described in following embodiments.

One Preferable Embodiment

Figure 1:
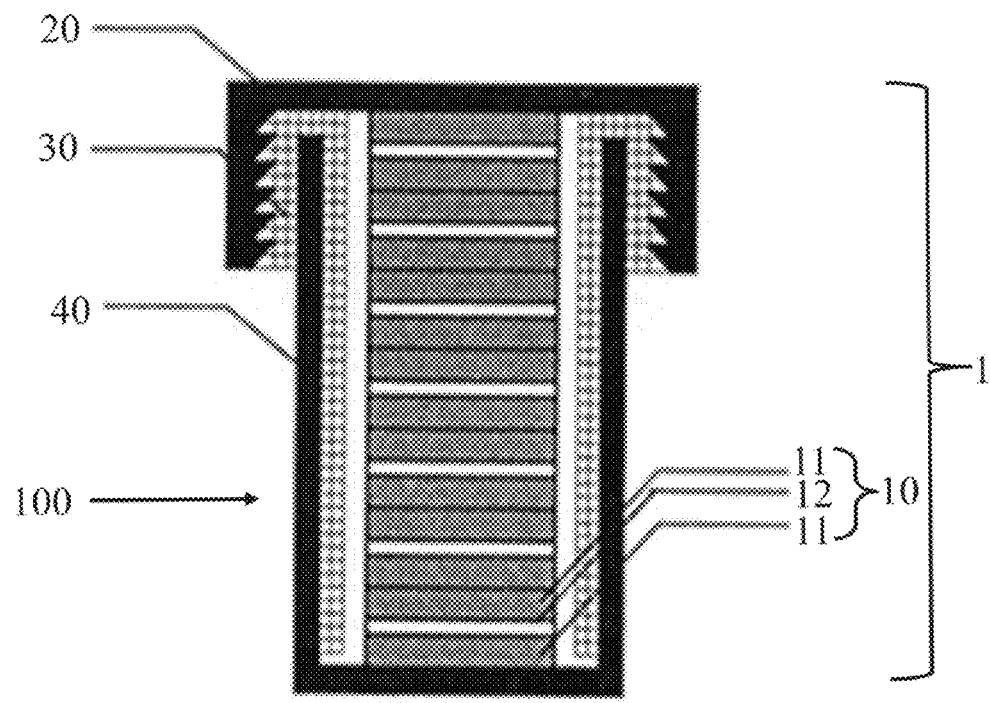
FIG. 1 illustrates a screw type of the packaging structure in the present invention.

In FIG. 1, an energy storage device 100 comprises an upper metallic case 20, a lower metallic case 40, a sealing gasket 30 and an assembly of at least one unit cell of capacitor 1. The sealing gasket 30 is a polymer and is configured between the upper metallic case 20 and the lower metallic case 40. The assembly of at least one unit cell of capacitor 1 is configured in the lower metallic case 40 and comprises at least one unit cell of capacitor 10 which is repeatedly stacked. The at least one unit cell of capacitor 10 is a sandwich structure and comprises a solid-state polymer electrolyte 12 between two modified carbonaceous electrodes 11. Because the thickness of single unit cell of capacitor is less than 5 mm, the assembly 1 of the at least one unite cell of capacitor 10 containing the at least one unit cell of capacitor 10 being stacked still remains thin. The upper metallic case 20 and the lower metallic case 40 with female and male threads are able to be screwed tightly with the sealing gasket 30 between the upper metallic case 20 and the lower metallic case 40. By the female and male threads to combine the upper metallic case 20 and the lower metallic case 40, the energy storage device 100 in the FIG. 1 illustrates a screw type of the packaging structure with a shape of cylinder. The cost can be reduced owing to the elimination of drilling, welding, screwing with nails, and making scaffolds. The two modified carbonaceous electrodes 11 can be a conductive carbon fiber material coated with an active material. The conductive carbon fiber material can be a carbon cloth, carbon felt, or carbon paper. The active material is made of active carbon as the major ingredient, carbon black and small amount of binder or binder with ionic conductivity. Because the two modified carbonaceous electrodes 11 possess great conductivity, collectors become unnecessary. The solid-state polymer electrolyte 12 can be polymeric material with great ion conductivity such as sulfonated polyether ether ketone (SPEEK). By using the solid-state polymer electrolyte 12, a separator is no longer needed and electrolyte leakage for a traditional capacitor is no longer considered.

Another Preferable Embodiment

Figure 2:
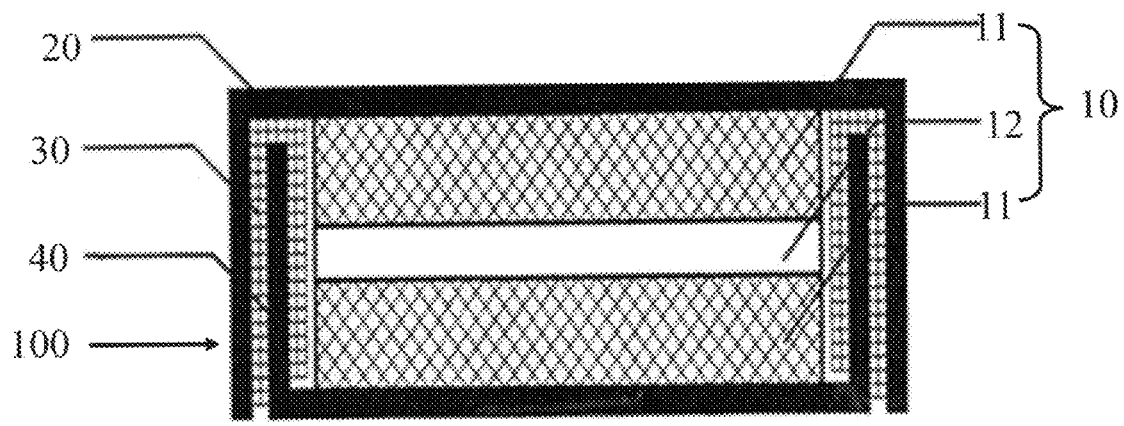
FIG. 2 illustrates a coin cell type of the packaging structure in the present invention.

The energy storage device 100 in the FIG. 2 comprises single unit cell of capacitor 10. The single unit cell of capacitor 10 is a sandwich structure and comprises a solid-state polymer electrolyte 12 interposed between two modified carbonaceous electrodes 11. The thickness of single unit cell of capacitor is less than 5 mm. The two modified carbonaceous electrodes 11 can be a conductive carbon fiber material with an active material. The conductive carbon fiber material can be a carbon cloth, a carbon felt, or a carbon paper. The single unit cell of capacitor 10 is configured in the lower metallic case 40. The lower metallic case 40, the upper metallic case 20 and the sealing gasket 30 are combined by a way of stamping. The upper metallic case 20 and the lower metallic case 40 are pressed tightly against the two modified carbonaceous electrodes 11. Owing to the high conductivity of the two modified carbonaceous electrodes 11, collectors are no long needed; consequently, the upper metallic case 20 and the lower metallic case 40 exhibit the functions of current collectors and conducting leads of a traditional capacitor. The energy storage device 100 is called a coin cell type of package due to the shape of package.

Another Preferable Embodiment

Figure 3:
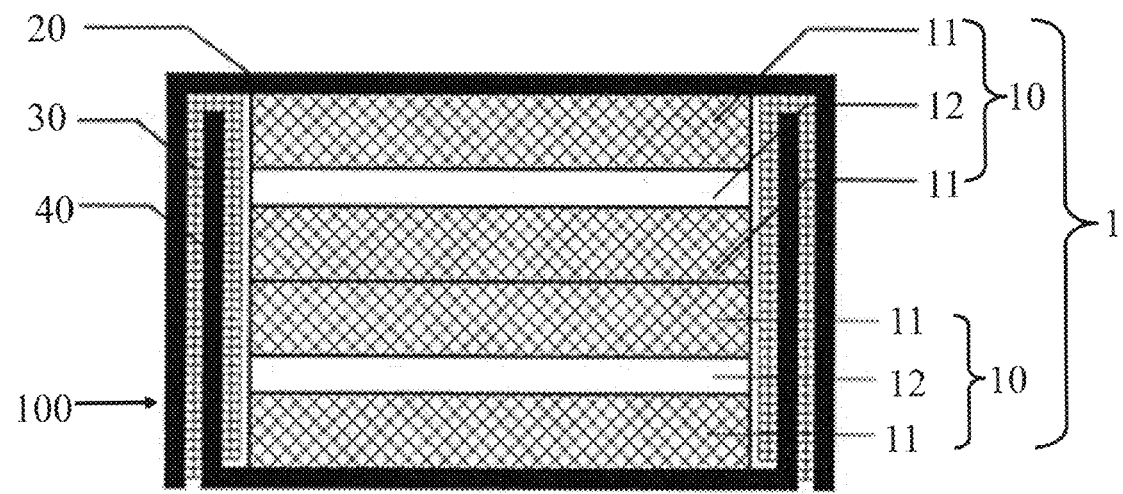
FIG. 3 illustrates a coin cell type of the packaging structure with two stacked unit cells of capacitor in the present invention.

In the FIG. 3, the energy storage device 100 comprises an assembly of at least one unit cell of capacitor 1 which comprises two unit cells of capacitor 10 being repeatedly stacked. The thickness of single unit cell of capacitor is less than 5 mm; consequently, the thickness of the two unit cells of capacitor after being stacked still remains small. Each of the two unit cell of capacitor 10 is a sandwich structure and comprises a solid-state polymer electrolyte 12 interposed between two modified carbonaceous electrodes 11. The two unit cells of capacitor 10 with sandwich structure are stacked and form a circuit connecting two unit cells in series, therefore, both the working voltage and output power are raised to about double values compared to those of a capacitor containing single unit cell. By stamping, the upper metallic case 20 and the lower metallic case 40 are combined with the sealing gasket 30 tightly, and the assembly of two unit cells of capacitor 1 is sealed between the upper metallic case 20 and the lower metallic case 40. The upper metallic case 20 and the lower metallic case 40 are pressed against the two modified carbonaceous electrodes 11 individually. Owing to the high conductivity of the two modified carbonaceous electrodes 11, collectors are no long needed; consequently, the upper metallic case 20 and the lower metallic case 40 exhibit the functions of collectors and leads of a traditional capacitor.

Another Preferable Embodiment

Figure 4:
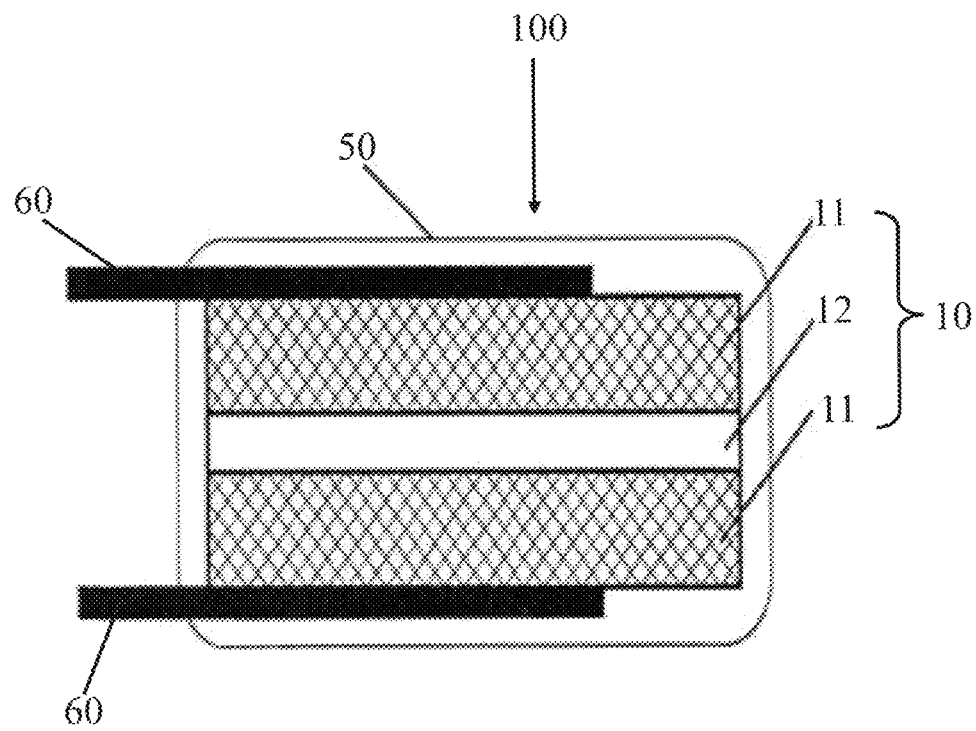
FIG. 4 illustrates a plastic case type of the packaging structure with single unit cell of capacitor in the present invention.

The energy storage device 100 in the FIG. 4 comprises single unit cell of capacitor 10 which is a sandwich structure and comprises a solid-state polymer electrolyte 12 interposed between two modified carbonaceous electrodes 11. The thickness of single unit cell of capacitor is less than 5 mm. Two leads 60 are connected to the surfaces of the two modified carbonaceous electrodes 11 individually. The two leads 60 can be welded, or glued with conductive adhesive to connect to the surfaces of the two modified carbonaceous electrodes 11. The single unit cell of capacitor 10 is encapsulated with a plastic package 50 by a way of compression molding or injection molding. The materials of plastic case 50 can be plastics or rubbers. After the plastic package 50 is sealed, the two leads 60 are partially exposed outside the plastic package 50. The energy storage device 100 thus made illustrates a plastic case type of the packaging structure. Capacitors with plastic cases can be easily fabricated by mass production.

Another Preferable Embodiment

Figure 5:
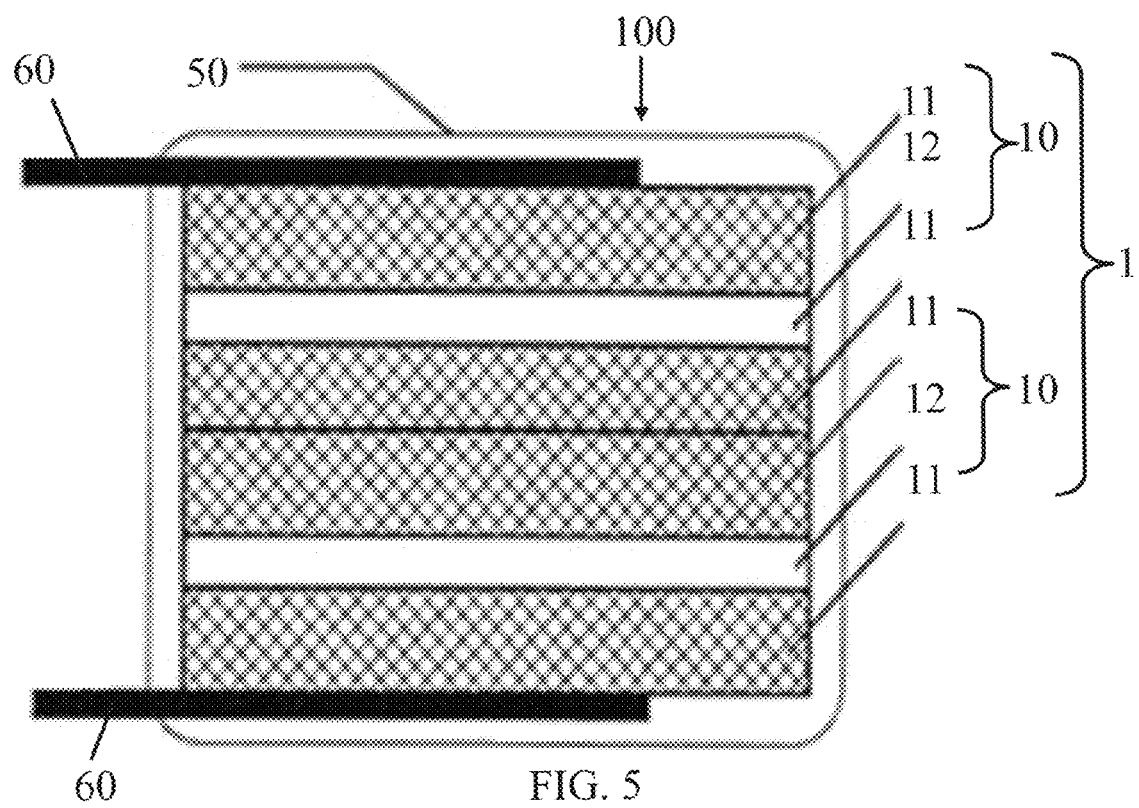
FIG. 5 illustrates a plastic case type of the packaging structure with two stacked unit cells in the present invention.

The energy storage device 100 in the FIG. 5 comprises an assembly of two unit cells of capacitor 1. Each of the two unit cells of capacitor 10 is a sandwich structure and comprises a solid-state polymer electrolyte 12 interposed between two carbonaceous electrodes 11. The two unit cells of capacitor 10 are stacked and connected in series, and form a series circuit to boost the voltage and power of the energy storage device 100. Two leads 60 are welded, or glued with conductive adhesive to connect to the surfaces of the two modified carbonaceous electrodes individually. The assembly of two unit cells 1 is then packaged with plastic package 50 by a way of compression molding or injection molding. The two leads 60 are partially exposed outside the plastic package 50. The materials of plastic package can be plastics or rubbers. The energy storage device 100 thus made illustrates a plastic case type of the packaging structure, which can be easily fabricated by mass production.

Another Preferable Embodiment

Figure 6:
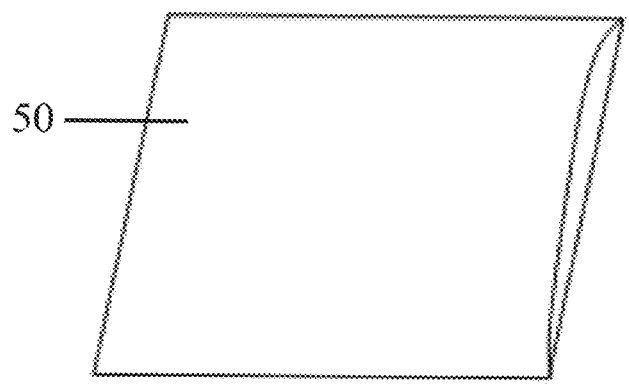
FIG. 6 (a) illustrates a plastic bag in the present invention.
Figure 6:
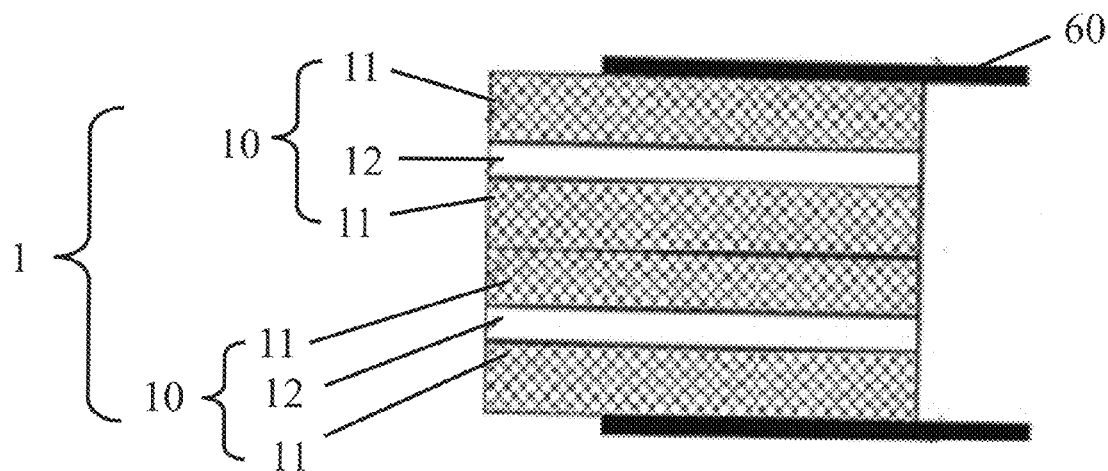
Figure 6:
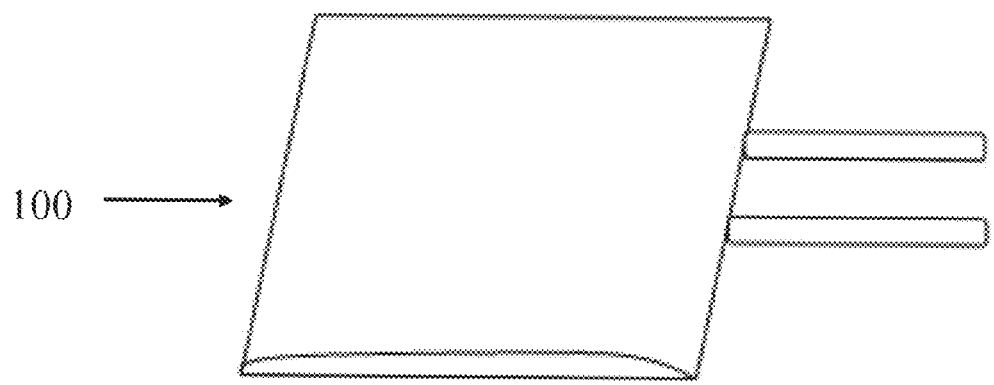

FIGS. 6 (a) to (c) show a bag type of energy storage device. In FIG. 6 (a), the plastic package 50 can be a plastic bag or an aluminum-foil bag with a layer of plastic material inside. In FIG. 6 (b), the assembly of at least one unit cell of capacitor 1 comprises two unit cells of capacitor 10 which are stacked and connected in series. Each of the two unit cells of capacitor 10 illustrates a sandwich structure and comprises a solid-state polymer electrolyte 12 interposed between two modified carbonaceous electrodes 11. Two leads are connected to the outer surfaces of the two modified carbonaceous electrodes 11. The assembly of the two unit cells of capacitor 1 with a pair of conducting leads 60 is put into the plastic package 50, afterwards, the plastic package 50 is sealed by heat sealing or vacuum heat sealing. The energy storage device 100 in FIG. 6(c) thus shows a bag type of the packaging structure.

Another Preferable Embodiment

Figure 7:
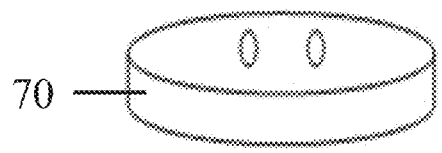
FIG. 7 (a) illustrates the lid of the energy storage device in the present invention.
Figure 7:
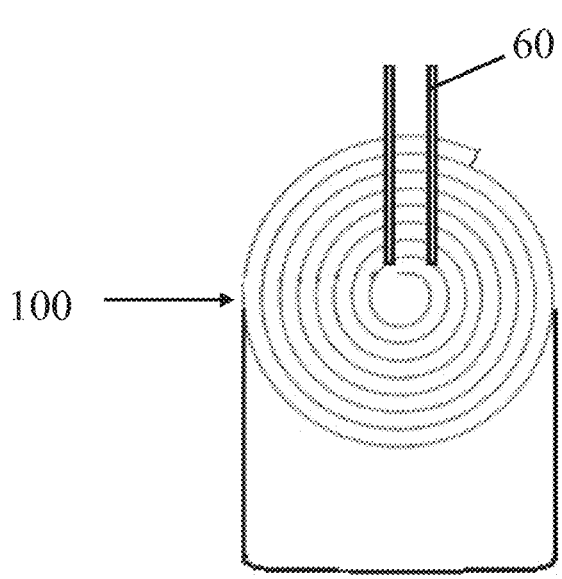
Figure 7:
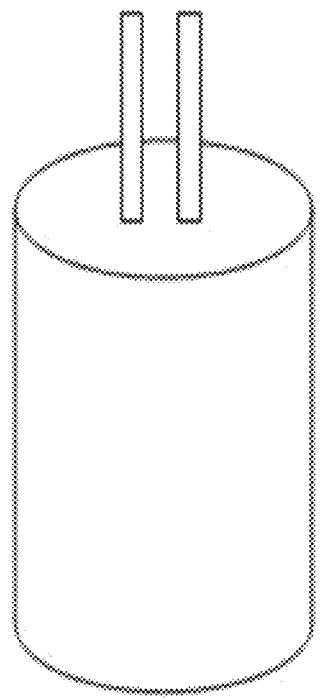
Figure 7:
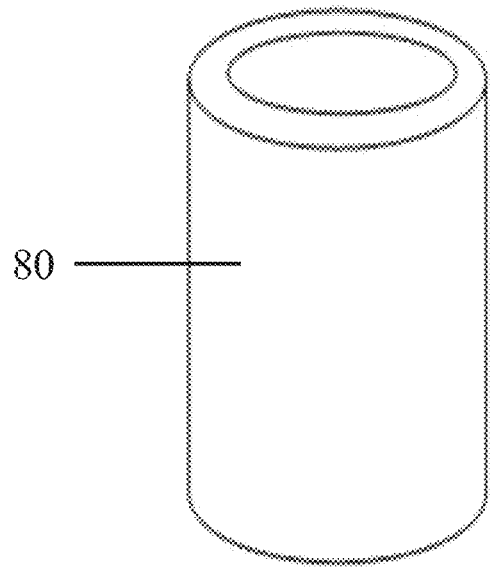

FIGS. 7 (a) to (d) show another preferred embodiment of FIGS. 6 (a) to (c). The bag type of energy storage device 100 in FIG. 6 (c) is rolled up or folded to form another preferable package in FIG. 7(b), which is afterwards placed into to a protective case 80 in FIG. 7 (c). After a protective lid 70 in FIG. 7(a) is put on the protective case 80, a bag type of energy storage device 100 with a protective case 80 and a protective lid 70 is completed.

The shape and size of described structure can be changed in accordance with needs. Comparing to the traditional manufacturing process, the packaging and manufacturing process of the present invention is easier, because of the material innovation and structural design of modified carbonaceous electrodes and solid-state polymer electrolytes. The manufacturing cost can be reduced because the process of drilling, welding, screwing with nails, and making scaffolds can be eliminated. In the present invention, the thickness of single unit cell of capacitor is less than 5 mm; therefore the thickness after the at least one unit cell of capacitor being repeatedly stacked remains small. The working voltage of single unit cell of capacitor can reach several voltages, and the power of it can be over thousands of watts. After repeatedly stacking the unit cells of capacitor and completing package, the energy storage device 100 can acquire higher voltage and power. The present invention can perform even better than a traditional capacitor module which is formed by connecting capacitors both in series and in parallel. Massive energy storage devices of the present invention can be utilized in electric grids, wind turbine systems, electric vehicles, and uninterruptible power supplies, small energy storage devices of the present invention can be utilized in various kinds of electronic devices.

What is claimed is:

1. A packaging structure of an energy storage device comprising:
   an upper package;
   a lower package combined with the upper package; and
   an assembly of at least one unit cell of capacitor configured between the upper package and the lower package and comprising the at least one unit cell of capacitor being repeatedly stacked;
   wherein the at least one unit cell of capacitor is in a sandwich structure and comprises a solid-state polymer electrolyte between two modified carbonaceous electrodes;
   wherein the upper package and the lower package are a metallic case with a female thread and a metallic case with a male thread respectively;
   wherein a sealing gasket is configured between the upper package and the lower package.

2. The packaging structure of an energy storage device claimed in claim 1, wherein the thickness of any one of the at least one unit cell of capacitor is less than 5 millimeters (mm).

3. The packaging structure of an energy storage device claimed in claim 1, wherein the material of the two modified carbonaceous electrodes is a conductive carbon fiber.

4. The packaging structure of an energy storage device claimed in claim 1, wherein two leads are connected to the surfaces of the two modified carbonaceous electrodes.

5. The packaging structure of an energy storage device claimed in claim 4, wherein the two leads are welded or glued with conductive adhesive to connect to the surfaces of the two modified carbonaceous electrodes individually.

6. A packaging structure of an energy storage device comprising:
   an upper metallic case;
   a lower metallic case, combined with the upper metallic case;
   a sealing gasket configured between the upper metallic case and the lower metallic case; and
   an assembly of at least one unit cell of capacitor configured between the upper package and the lower package and comprising at least one unit cell of capacitor being repeatedly stacked;
   wherein the at least one unit cell of capacitor is in a sandwich structure and comprises a solid-state polymer electrolyte between two modified carbonaceous electrodes;
   wherein the upper metallic case and the lower metallic case comprise a female thread and a male thread respectively;
   wherein the female thread and the male thread are configured to be screwed with the sealing gasket to form a screw type of the packaging structure.

7. The packaging structure of an energy storage device claimed in claim 6, wherein the thickness of any one of the at least one unit cell of capacitor is less than 5 mm.

8. The packaging structure of an energy storage device claimed in claim 6, wherein the material of the two modified carbonaceous electrodes is conductive carbon fiber.

\* \* \* \* \*